United States Patent [19]

Tanikoshi et al.

[11] 3,818,494

[45] June 18, 1974

[54] EXPOSURE CONTROL DEVICE

[75] Inventors: Kinzi Tanikoshi; Tomoshi Takigawa, both of Tokyo, Japan

[73] Assignee: Canon Kabushiki Kaisha, Tokyo, Japan

[22] Filed: July 6, 1972

[21] Appl. No.: 269,327

[30] Foreign Application Priority Data

| | | |
|---|---|---|
| July 8, 1971 | Japan | 46-50462 |
| Aug. 9, 1971 | Japan | 46-60131 |
| Sept. 7, 1971 | Japan | 46-69398 |
| Oct. 12, 1971 | Japan | 46-94085 |
| Nov. 18, 1971 | Japan | 46-108046 |

[52] U.S. Cl. ...................... 354/42, 352/141, 354/43, 354/44

[51] Int. Cl. ............................................ G03b 7/10

[58] Field of Search ......... 95/10 CD, 64 D; 352/141

[56] References Cited

UNITED STATES PATENTS

| | | | |
|---|---|---|---|
| 3,120,161 | 2/1964 | Peckens et al. | 95/10 CD |
| 3,430,053 | 2/1969 | Weshaver | 95/10 CD |
| 3,455,227 | 7/1969 | Sato et al. | 95/10 CD |
| 3,461,786 | 8/1969 | Sato et al. | 95/10 CD |
| 3,605,001 | 9/1971 | Miyakawa | 95/10 CD |
| 3,611,894 | 10/1971 | Minneste | 95/10 CD |
| 3,651,324 | 3/1972 | Carter et al. | 95/10 CD |

*Primary Examiner*—Samuel S. Matthews
*Assistant Examiner*—Russell E. Adams, Jr.
*Attorney, Agent, or Firm*—William R. Woodward; Flynn & Frishauf

[57] ABSTRACT

This specification discloses an improved exposure control device for cameras. The device comprises an aperture mechanism for controlling the quantity of incident light, a photoelectric converter element for receiving a light beam passed through the aperture mechanism to convert it into an electrical signal, a detection circuit for detecting a signal from said element and comparing it with a signal representing the photographing conditions to produce a signal for adjusting the quantity of light passed through said aperture mechanism, a control circuit for receiving the signal from said detection circuit to control and drive said aperture mechanism so that the level of said signal becomes zero, and a phase compensation circuit connected with both said detection circuit and said control circuit. The phase compensation circuit improves the frequency characteristic of the output signal from said detection circuit, thereby preventing the occurrence of phenomena such as hunting and the like and enabling a proper exposure to be provided.

20 Claims, 16 Drawing Figures

EXPOSURE CONTROL DEVICE

BACKGROUND OF THE INVENTION

1. Field of the Invention

This invention relates to an exposure control device for use with cameras or the like, and more particularly to improvements in an automatic exposure control device which employs a servo system to vary the stop opening of the aperture means in accordance with the quantity of light received by photometric means to thereby provide a proper exposure value.

2. Description of the Prior Art

An automatic exposure control device used with a camera or the like must satisfy the following conditions:

1. that its performance be invariable with any variation in source voltage;

2. that its performance be invariable with any variation in ambient temperature;

3. that it should be quick in responding to the variation in the brightness of an object to be photographed; and 4. that a motor or a meter incorporated in the camera be free from the phenomenon of hunting.

Conventional exposure control devices of such type have been such that an aperture mechanism is controlled by a servomotor or a meter movement to provide a proper exposure value, and most of these devices have adopted a system in which the output of a bridge circuit is detected by a transistorized detection circuit and such detected output is used to revolve the servomotor to balance the bridge circuit. With such devices, however, it has been impossible to prevent an unstable operation attributable to the hunting or like phenomenon of the motor and these conventional devices have required a circuit for imparting a braking action to the motor in addition to a motor drive circuit, which has led to the complicated construction of the devices.

Further, cinecameras or motor-driven cameras require the provision of an electric power supply battery for driving a film and of an electric power supply battery for driving an automatic exposure device, and these two batteries are often separate. This is because that the film drive battery must be of a great capacity while the other battery may be of a small capacity and requires a stable operating voltage therefor. The provision of two different power supply batteries is inconvenient particularly in making light-weight cameras and therefore, an electric power supply means using a single battery in common for the two different purposes has been employed in simply constructed cinecameras and the like. In such cases, if the battery used is of a small capacity, a great voltage variation will be caused by a transient current flowing upon starting of the film drive motor, thereby making the operation of the exposure circuit unsuitable and accordingly providing an improper exposure.

SUMMARY OF THE INVENTION

It is an object of the present invention to provide an improved exposure control device which eliminates the disadvantages noted above with respect to the prior art and which has an enhanced response characteristic.

It is another object of the present invention to provide an exposure control device in which an electric output signal from an input circuit corresponding to the quantity of light incident on a photoelectric converter element included in the input circuit is applied through a preset compensation circuit to an output circuit to prevent any delayed response to the exposure detector means and the phenomenon of hunting.

It is still another object of the present invention to provide an automatic exposure control device which employs a servo control system to operate an automatic aperture mechanism and which can always provide an optimum compensation effect and fulfil a stable performance.

It is yet another object of the present invention to provide an exposure control device which employs a phase compensation circuit to prevent the occurrence of hunting and which uses a constant voltage circuit to permit a single power supply source to be employed in common for the purposes of driving the film and the aperture means without the latter being affected by any variation in the voltage of the power supply source.

It is yet still another object of the present invention to provide an exposure control device which employs a servo control system having a bridge circuit to operate an automatic exposure mechanism and in which any excessive unbalanced output of the bridge circuit may be restricted to prevent passage of an overcurrent to a meter movement or a motor.

It is a further object of the present invention to provide an exposure control device which is applicable to cameras and in which an initial bias is imparted to the light quantity detector means so that when the electric power supply circuit is opened the output signal from the detector means may provide a positional signal corresponding to the position of the light adjusting means irrespective of the light entering through light control means.

It is a further object of the present invention to provide an exposure control device in which an electric power supply circuit for operating a camera is closed to complete the preparations for camera operation such as film driving and the like and at the same time the driving of exposure control means is initiated to thereby reduce the time required to detect a proper exposure during the camera operation, in which the characteristic of response to the variation of incident light with time is improved and in which said closing of the power supply circuit drives only the exposure control means to predict the brightness condition of the object to be photographed.

It is still a further object of the present invention to provide an exposure control device in which a very simple additional circuit is provided to enable the exposure control device, particularly an automatic exposure control device using a servo system, to be manually operated as well.

BRIEF DESCRIPTION OF THE DRAWINGS

Other objects and features of the present invention will become fully apparent from the following detailed description taken in conjunction with the accompanying drawings, in which.

DESCRIPTION OF THE PREFERRED EMBODIMENTS

Figure 1:
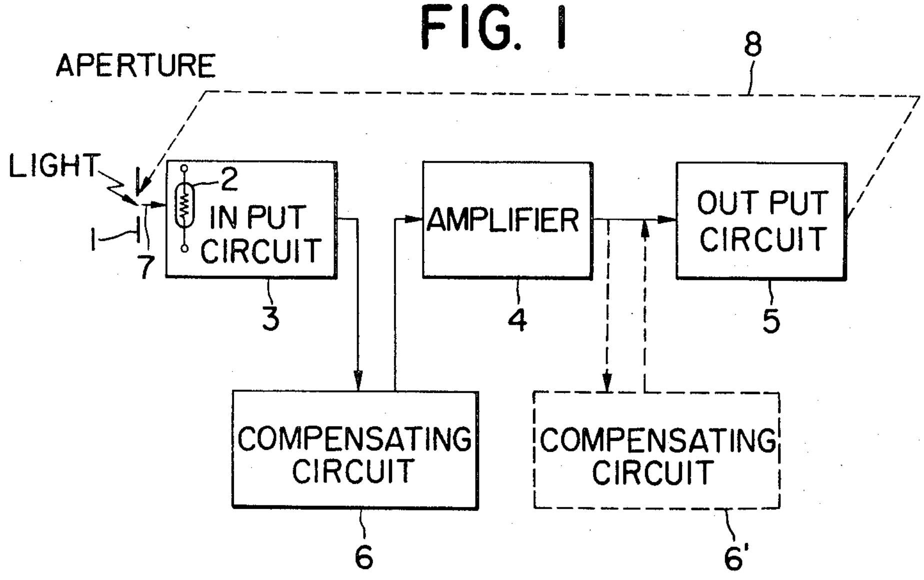
FIG. 1 is a block diagram generally showing the exposure control device according to the present invention.

Referring to FIG. 1, an embodiment of the exposure control device according to the present invention is shown in block diagram. Aperture means 1 has its stop opening adjustable to control the quantity of light passing therethrough. A photoelectric converter element is provided to receive the light passed through the stop opening and convert it into an electrical signal corresponding to the quantity of light so received. An input circuit including the photoelectric converter element is designated by numeral 3 and will later be described more fully. An amplifier means 4 is provided to amplify the electrical signal. Output means 5 is connected with the amplifier 4 to receive the electrical signal amplified thereby to produce a drive energy necessary to accomplish an exposure control. In accordance with the information from such output means, aperture means for controlling a picture-taking light beam and aperture means for controlling a metering light beam may be adjusted to ensure proper control of the exposure for film.

According to the present invention, in addition to the general arrangement described above, compensator means 6 may be provided to further enhance the exposure control effect. For example, as indicated by full lines, compensator means 6 including a phase compensation circuit whose frequency transfer function has been preset may be inserted between the input means 3 and the amplifier means 4. Alternatively, as indicated by phantom lines, compensator means 6′ may be inserted between the amplifier means 4 and the output means 5 to constitute an exposure control circuit. Such compensator means may be, for example, a phase compensation circuit to be further described that can compensate for any advance or delay in phase.

The present invention constitutes a servo control system by which an electric output signal from the input means 3 corresponding to the quantity of light 7 entering the photoelectric converter element 2 in the input means 3 is applied as input to the output means 5 through the compensation circuit 6 serially connected with the input means and having a preset frequency transfer function and in which the information from such output means is fed back to the aperture means by operation of the latter over the output line 8. In particular, such system may be applied to an exposure control device for camera to thereby prevent any delay in response of the device and the occurrence of a phenomenon known as hunting. The compensator means may include not only the aforesaid phase compensator means but also means for stabilizing the control, such as electric source stabilization means and means for clamping any overcurrent or overvoltage. These latter means will be described hereunder with respect to FIG. 2.

Figure 2:
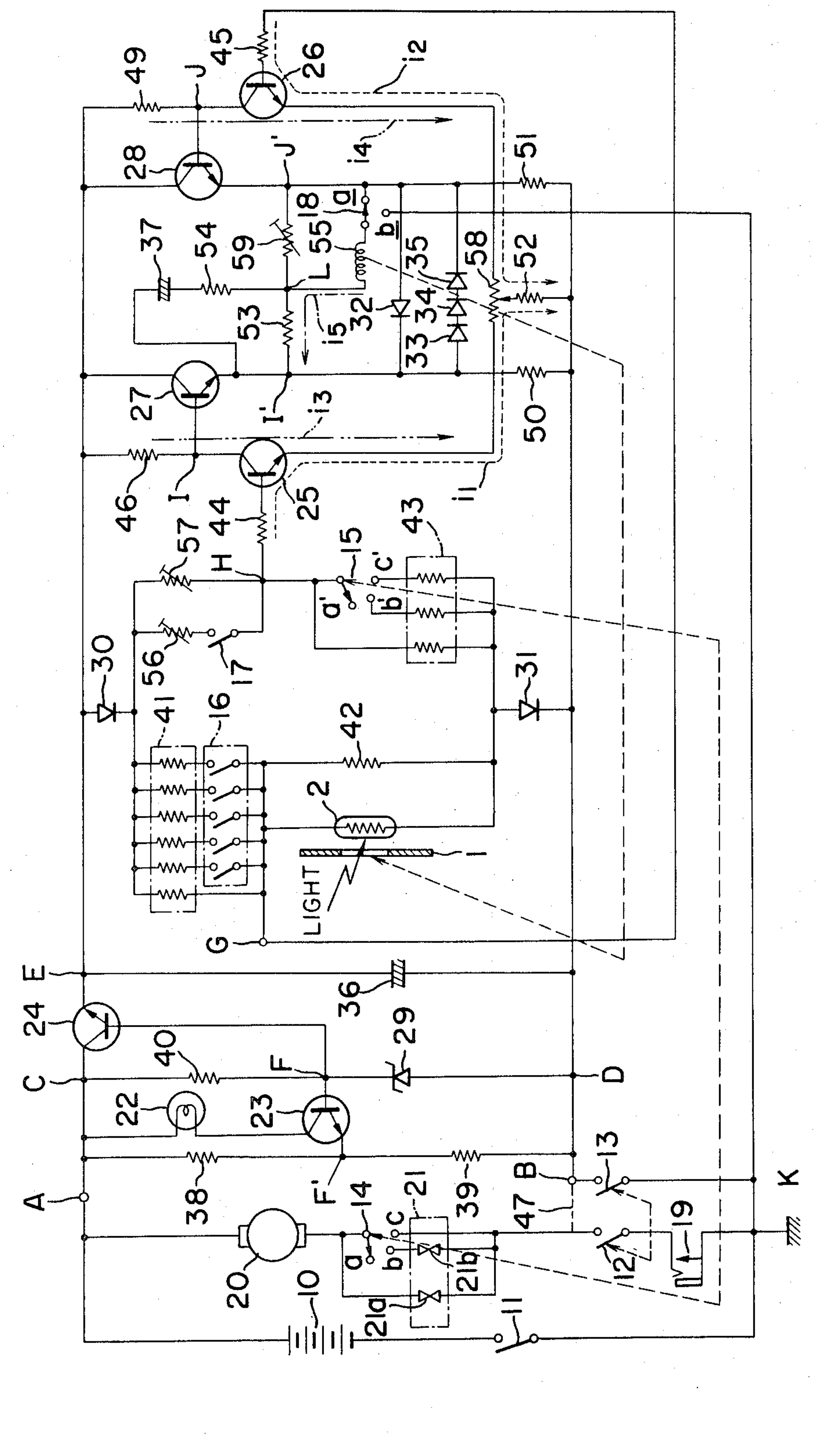
FIG. 2 is a diagram showing an electric circuit in an embodiment of the exposure control device according to the present invention.

Referring to FIG. 2, there is shown the electric circuit of one embodiment of the exposure control device according to the present invention. The circuit includes an electric power supply source such as battery 10, a main switch 11, and a motor 20 for driving the film. Governor contact means 21 for controlling the speed of the motor 20 to a predetermined level comprises two contacts 21*a* and 21*b*. A switch 14 for changing over the governor contact 21 has three contacts *a*, *b* and *c*. These contacts *a*, *b* and *c* serve to select the speeds of the film driven in a cinecamera, say, 18 frames/sec, 24 frames/sec and high speed, respectively. A camera's release switch and a remote control jack are designated by 12 and 19, respectively. A switch 13 for the exposure control device is operatively associated with the release switch 12. These two switches 12 and 13 may be so arranged that they are operated stepwise in accordance with the stroke of depression of a shutter release button, namely, that the switch 13 is closed by a first stage of the stroke to operate the exposure control device alone to predict the brightness of an object to be photographed. There are further provided voltage dividing resistors 38 and 39, and a lamp 22 adapted to turn on in response to a voltage drop of the electric power source 10. An NPN transistor 23, a resistor 40 and a constant voltage diode 29 are provided to constitute a lamp energization circuit for turning on the lamp 22 in response to any source voltage drop below a predetermined level. As will be described later, light emitted from such lamp may illuminate the interior of the viewfinder to indicate the source voltage drop to the operator of the camera.

An NPN transistor 24 and a field capacitor 36, with the aforesaid resistor 40 and constant voltage diode 29, constitute a source voltage stabilization circuit.

There are also provided diodes 30, 31, block resistor 41 corresponding to the film sensitivity and a group of switches 16 for changing over the block resistor 41 to thereby set up various film sensitivites. In FIG. 2, numerals 1 and 2 correspond to the aperture means for controlling the metering light beam and the photoelectric converter element disposed behind the aperture means, which have both been described above with respect to FIG. 1. Where the aperture means for controlling the metering light beam is not common with the aperture means for controlling the picture-taking light beam, the two aperture means may of course be associated together to provide a proper exposure for the film. A resistor 42 is provided to improve the characteristic of the aforesaid photo-electric converter element. Variable or semi-fixed resistors 56 and 57 are provided to adjust a bridge circuit to be described. A switch 17 is provided to change over the resistor 56. A block resistor 43 corresponds to the rate of revolution of the motor 20, and a switch 15 is associated with the switch 14 to change over the resistor 43. The switch 15 has contacts *a'*, *b'* and *c'* which correspond to 18 frames/sec, 24 frames/sec and high speed, respectively. The resistor 41, switch 16, photoelectric converter element 2, resistor 42, semi-fixed resistors 56 and 57, switches 17 and 15 and resistor 43 together constitute a bridge circuit.

A differential amplifier is constituted by resistors 44, 45, 46, 49, 52, a variable resistor 58 for adjusting the balance of the differential amplifier, and NPN transistors 25, 26. The differential amplifier has its amplification factor invariable with any temperature variation. A variable resistor 59 is provided to adjust the amplification factor of the differential amplifier.

A buffer circuit is constituted by NPN transistors 27, 28 and resistors 50, 51.

Diodes 32, 33, 34, 35 connected asymmetrically between the emitters of transistors 27 and 28 in the manner as shown constitute a clamping circuit for blocking any overcurrent or overvoltage to safeguard the entire circuit.

A phase compensation circuit is provided by resistors 53, 54, field capacitor 37 and variable resistor 59.

Means such as meter movement 55 is provided to adjust the aperture means 1. A switch 18 may be used to change over the mode of operation from a mode for automatically adjusting the aperture means by the drive of a meter movement, servomotor or the like to a mode for manually adjusting such aperture means. The switch 18 is such that it permits automatic operation when its contact *a* is closed and that it permits manual operation when its contact *b* is closed.

Description will now be made of the exposure control device of the above-described construction with reference to FIG. 2. The governor contact means 21 has contacts 21*a* and 21*b* which are adapted to open when the film speed exceeds a predetermined level, say, 18 frames/sec or 24 frames/sec to thereby maintain a constant speed characteristic of the motor 20. The remote control jack 19 may be connected to a plug having switch means to thereby extraneously control the motor 20 by closing the release switch 12.

The release switch 12 may also serve as the operating switch 13 for the automatic exposure control device, and in such a case, the switch 13 may of course be eliminated with the circuit connected as indicated by phantom line 47 in FIG. 2.

When the potential divided by the resistors 38 and 39, i.e. the potential at point F' is lower than the potential at point F maintained constant by the resistor 40 and constant voltage diode 29, in accordance with the base-emitter potential $V_{BE}$ of the transistor 23 (approximately 0.6 volt in case of silicon transistor), then the transistor 23 is switched from OFF state to ON state so that the collector potential of this transistor is reduced to permit passage of a current to the lamp 22, which is thus turned on. Therefore, by presetting the potential at point F to a predetermined level necessary for the operation of the camera with the aid of the constant voltage diode, the operator of the camera may know the reduction in the source voltage from the turn-on of the lamp 22.

When the potential at point E is reduced below the potential at point F by an amount corresponding to the base-emitter potential $V_{BE}$ of the transistor 24, the same transistor will be turned on and so maintained until the potential at point E is lower than the potential at point F by an amount slightly smaller than $V_{BE}$. As a result, the potential at point E is maintained at a constant level always slightly lower than the potential at point F. Since the potential at point F is maintained constant by the constant voltage diode, the potential at point E is also constant.

The field capacitor 36 serves to absorb any ripple voltage contained in the potential at point C. Other modifications of the source voltage stabilization circuit and the operation thereof will described later.

The aforesaid bridge circuit is such that the potentials at points G and H are equal or balanced when the resistance value of the photoelectric converter element assumes a predetermined value $C_D$ determined by the resistor 41, switch 41, resistor 42, semi-fixed resistors 56, 57, switches 17, 15 and resistor 43. When the opening of the aperture means 1 is so much open as to permit too great a quantity of light to enter the light receiving surface of the photo-electric converter element 2, the resistance value of the photo-electric converter element is reduced below the aforesaid $C_D$. Accordingly, the potential at point G becomes lower than that at point H, so that the current $i_2$ flowing through resistor 45, transistor 26 and resistors 58,52 is smaller than the current $i_1$ flowing through resistor 44, transistor 25 and resistors 58,52. Consequently, the current $i_4$ flowing through resistor 49, transistor 26 and resistors 58,52 is smaller than the current $i_3$ flowing through resistor 46, transistor 25 and resistors 58,52, so that the voltage drop in the resistor 49 is smaller than that in the resistor 48, and thus the potential at point I becomes lower than the potential at point J. By that time, the potential at point I' has already become lower than that at point I by an amount corresponding to the base-emitter potential $V_{BE}$ of transistor 27, and the transistor 27 is turned on to pass a heavy current until the potential at point I' becomes lower than the potential at point I by an amount slightly lower than $V_{BE}$, so that the potential at point I' is maintained at a level lower than the potential at point I by an amount approximate to $V_B$.

As regards the potential difference between points J and J', the potential at point J' is similarly maintained at a level lower than the potential at point J by an amount slightly lower than the emitter-base potential $V_{BE}$ of transistor 28. Since the potential at point I is lower than that at point J, the potential at point I' is maintained at a level lower than that point J'. As a result, a current $i_5$ flows from point J' to point I' through meter or motor coil 55 and resistor 53. In accordance with the direction and amount of such current, the aperture means 1 associated with the coil 55 is moved to close its opening. This reduces the quantity of light entering the light receiving surface of the photoelectric converter element 2, which thus increases its resistance value to a predetermined value $C_D$ for balancing the bridge circuit, so that the potentials at the output terminals G and H of the bridge are equal to each other. As a result, the potentials at points I and J also become equal to each other and no current flows through the coil 55 and resistor 53, thus completing the adjustment of the stop opening of the aperture means 1 associated with the coil 55.

The operation has been described with respect to the case where the intial stop opening of the aperture means is too great. The operation is again substantially similar in case where the stop opening of the aperture means is to be increased in accordance with the quantity of light. In this latter case, the potential at point J is lower than that at point I and a current $i_6$ opposite in direction to current $i_5$ flows through the coil 55 so as to increase the stop opening of the aperture means until the bridge circuit is balanced.

Description will hereunder be made of the operation of the phase compensator means applied to the automatic exposure control device according to the present invention.

Figures 3A, 3B:
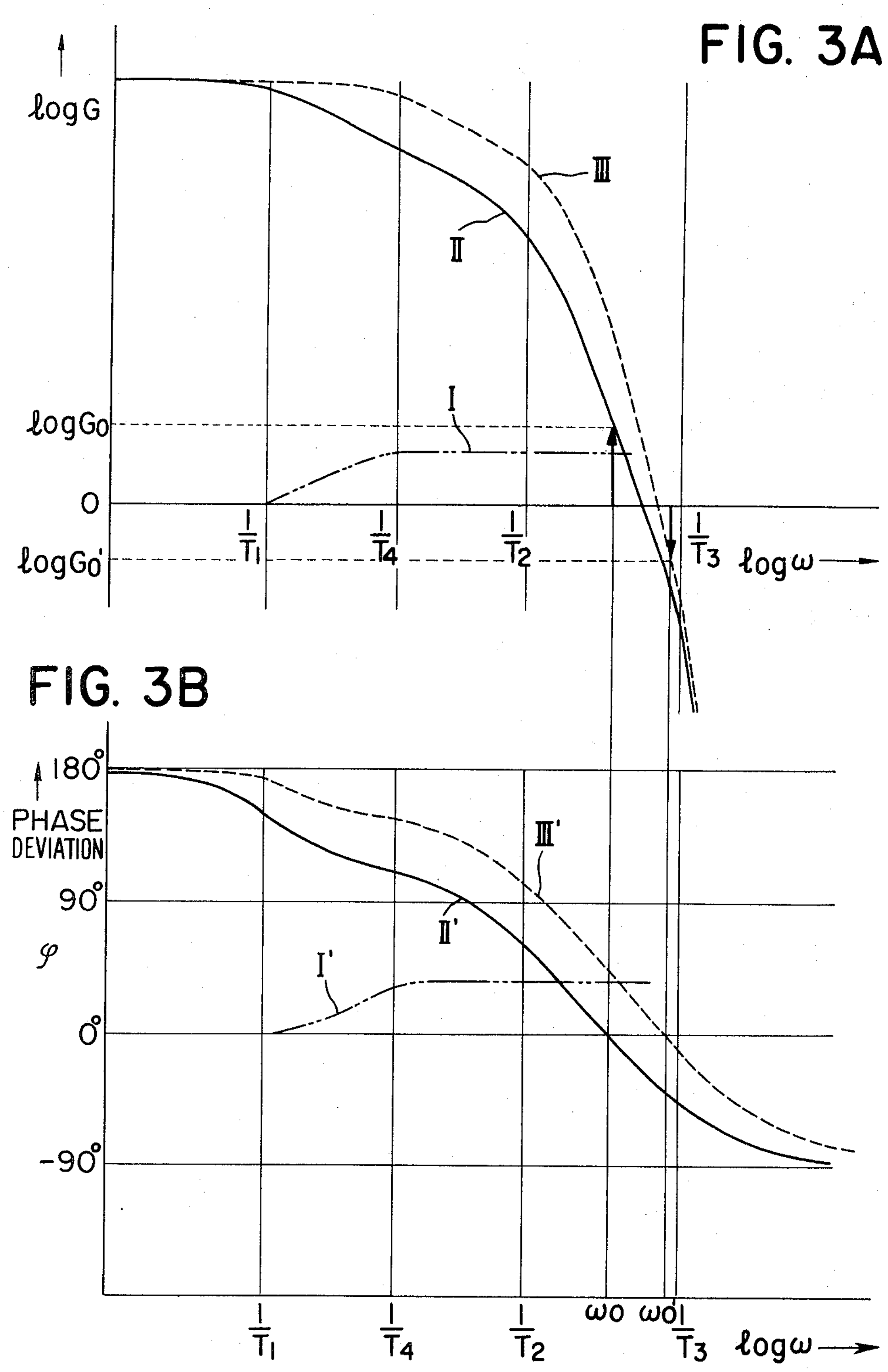
FIGS. 3A and 3B graphically show the frequency characteristic of the exposure control device shown in FIG. 2, FIG. 3A particularly showing gain curves and FIG. 3B showing phase curves.

The frequency characteristics of the aperture means 1 and the photoelectric converter element 1 are shown in FIGS. 3A and 3B, where the abscissa represents the frequency $\omega$ in logarithmic quantity and the ordinate represents the gain G in logarithmic quantity and the phase shift $\phi$ in angle. If the frequency band in which the gain is flat is narrow as seen from the gain curve represented by a full-line II in FIG. 3A with resultant inferior frequency characteristics of the aperture means and photoelectric converter elements, then such frequency characteristics may be improved by the phase compensator means comprising resistors 53, 54, 59 and capacitor 37 of FIG. 2, as seen from the broken line in FIG. 3A. Such phase compensator means will be described more fully hereunder.

To facilitate understanding of the description, let the resistance values of the resistors 53, 54 and 59 be $R_1$, zero and $R_2$, respectively, and let the capacitance of the capacitor be C. It is also assumed that the resistance of the coil 55 is greater than $R_2$. In FIG. 2, the points I' and J' are input terminals and the points L and J' are output terminals. The frequency transfer function $Y_1$ may be obtained by the following equation:

$$Y_1 = \frac{R_2}{R_2 + \frac{1}{j\omega C_1 + \frac{1}{R_1}}} \qquad (1)$$

where $j$ is an imaginary number and $\omega$ is an angular frequency.

This equation may be transformed into:

$$Y_1 = \frac{1+\frac{R_2}{R_1}}{\frac{R_2}{R_1}} \times \frac{j\omega C_1 R_1 + 1}{j\omega\frac{C_1 R_2}{1+\frac{R_2}{R_1}} + 1} \qquad (2)$$

According to the theory of automatic control, the frequency transfer function $Y_2$ of curves II, II' shown in FIGS. 3A and B may be approximately expressed by the following equation using time constants $T_1$, $T_2$ and $T_3$.

$Y_2 = Y_0\ X\ (1)/(j\omega T_1 + 1) \times (1)/(j\omega T_2 + 1) \times (1)/(j\omega T_3 + 1)$ (3), where $Y_0$ is constant and the time constants $T_1$, $T_2$ and $T_3$ are in the relation that $T_1 > T_2 > T_3$.

Thus, the frequency transfer function $Y_3$ including the phase compensator means, aperture means and photoelectric converter element is given as follows:

$$Y_3 = Y_1 \times Y_2$$

$$Y_3 = Y_1 \times Y_2 = \frac{1+\frac{R_2}{R_1}}{\frac{R_2}{R_1}} \times \frac{j\omega C R_2 + 1}{j\omega\frac{C_1 R_2}{1+\frac{R_2}{R_1}} + 1} \times \frac{Y_0}{j\omega T_1 + 1} \times \frac{Y_0}{j\omega T_1 + 1} \times \frac{1}{j\omega T_2 + 1} \times \frac{1}{j\omega T_3 + 1} \qquad (4)$$

If $C_1 R_1 = T_1$, $$Y_3 = \frac{1+\frac{R_2}{R_1}}{\frac{R_2}{R_1}} \times Y_0 \times \frac{1}{j\omega\frac{C_1 R_2}{1+\frac{R_2}{R_1}}} \times \frac{1}{j\omega T_2 + 1} \times \frac{1}{j\omega T_3 + 1} \qquad (4')$$

If $T_4 = [(C_1 R_2)/(1 + (R_2/R_1)\ ]$ $T_4 = [C_1 R_2/1 + (R_2/R_1)\ ] = C_1 R_1 \times (R_2)/(R_1 + R_2) = T_1 (R_2)/(R_1 + R_2) < T_1$ Consequently, $T_4 < T_1$. Hence, if $T_1 > T_4 > T_2 > T_3$, $(1/T_1) < (1/T_4) < (1T_2) < (1/T_3)$. Thus, the frequency transfer function $Y_3$ when the phase compensation has been effected may be represented by the gain and phase curves III and III' in FIGS. 3A and B which are products of curves I and II, and I' and II', respectively.

It is assumed that the angular frequency is $\omega_0$ when the phase shift $\phi$ of the phase curve II' in FIG. 3B is 0° and that the angular frequency is $\omega_0'$ when the phase shift $\phi$ of the phase curve III' is 0°. It is also assumed that the gain of the gain curve II in FIg. 3A is $G_0$ for the angular frequency $\omega_0$ and that the gain of the gain curve III is $G_0'$ for the angular frequency $\omega_0$. If the gain curve II when no phase compensation is effected is compared with the gain curve III when the phase compensation is effected, it will be clearly seen that the gain curve II as shown in FIG. 3A may be improved in its characteristic by the phase compensation being effected. The gain margins $G_0$ and $G_0'$ of the control system when the foregoing phase compensation is and is not effected are in the relation that $G_0> 1$ and $G_0 '<1$, since log $G_0>0$ and log $G_0'< 1$. It is known from the Nyquist stability criterion that the servo control system is unstable for the gain margin greater than 1 and stable for the gain margin smaller than 1. Thus, according to the theory of automatic control, the control system as represented by the curves II and II′ in FIGS. 3A and B is an unstable servo system. In contrast, the control system as represented by the curves III and III′ resulting from the phase compensation is a stable servo system. Accordingly, by applying a phase compensation circuit to the exposure control device of the present invention, the characteristics as represented by the curves II and II′ in FIGS. 3A and B can be improved into the characteristics as represented by the curves III and III′. Such improved characteristics will lead to reduced overshooting and hunting of the exposure control device and accordingly to the elimination of the flickering of the image plane which would otherwise result from an improper exposure when an object of different brightness is being photographed.

The operation of the phase compensation circuit as a phase advance circuit has been described hitherto. The use of the phase compensation circuit as a phase advance circuit or a phase delay circuit will be described later.

Referring again to FIG. 2, the source voltage stabilization and ripple filter circuit constituted by resister 40, constant voltage diode 29, transistor 24 and capacitor 36 can apply a stable voltage to each circuit element for any variation of the electric power supply source 10 because the potential at point E is constant irrespective of the variation of the source 10.

In FIG. 2, the clamping circuit constituted by diodes 32, 33, 34 and 35 serves to prevent any unbalanced output of the bridge circuit, and accordingly any overvoltage between the terminals G and H, which would result in an overcurrent passing through the coil 55 of the meter movement or the like to destroy it. The meter movement (or galvanometer drive) is taken here as an example of a device for controlling the aperture. Where the meter movement used in the device of the present invention is of such a construction that when no current flows thereto it is normally biased in one direction by a spring or like means as will be described, the force with which one or more aperture blades act on a mechanical stop member when the aperture means driven by the meter movement is stopped down differs from the force with which the aperture blade or blades act on a stop member when the aperture is opened. In view of the possible effect imparted by such spring force, the present invention employs an asymmetric clamping circuit.

In FIG. 2, if the diodes 32 to 35 are silicon diodes, the potential at point I′ may be always maintained about 1.8 volt higher than that at point J′ when the potential at point I is about 1.8 volt higher than that at point J. Conversely, the potential at point J′ may be always maintained about 0.6 volt higher than that at point I′ when the potential at point J is about 0.8 volt higher than that at point I.

Therefore, when an excessive unbalanced output occurs at the output terminal of the bridge circuit, it is possible to prevent any overcurrent from flowing through the coil 55 of the meter or the like by limiting the potential difference between point I′ and J′ to a predetermined value.

In an embodiment of the present invention, the use of the asymmetric clamping circuit is attributable to the fact that a spring-biased meter movement is used, preferably towards one extreme. More specifically, the design is such that when the potential difference between points I′ and J′ is clamped by a voltage determined by the diode 32, the value P of the force resulting from the current flowing through the coil 55 of the meter or the like plus the spring force becomes equal to the value Q of the force resulting from the current flowing in the meter as clamped by a voltage determined by the diodes 33, 34, 35 minus the spring force. By this, the force interacting between the blades of the aperture means driven from the meter or the like and the stop member can be made equal to each other in either direction, i.e. both in the direction for closing the stop opening and in the direction for opening the stop opening.

Although the mechanical construction for this purpose will later be described more fully, it should be noted that the use of such a clamping circuit prevents passage of any overcurrent through through the coil 55 and increases the service life of the meter movement even if the resistance value of the photoelectric converter element is so much deviated from the predetermined value $C_D$ as to produce a great output balance between the output terminals G and H of the bridge.

Switch 18 constitutes a means for automatically controlling or manually changing over the aperture means 7. In the illustrated embodiment, the contact *a* of the switch 18 may be used for the automatic control and the contact *b* for the manual or similar control.

When the switch 18 is closed at its contact *a*, a current will normally flow from point L via contact *a* to point K to thereby shift the blades of the aperture means in the direction for opening the stop opening and hold the blades at a predetermined open position. From this position, the aperture means can be freely set manually or similarly in accordance with the brightness of the object to be photographed.

Figure 4:
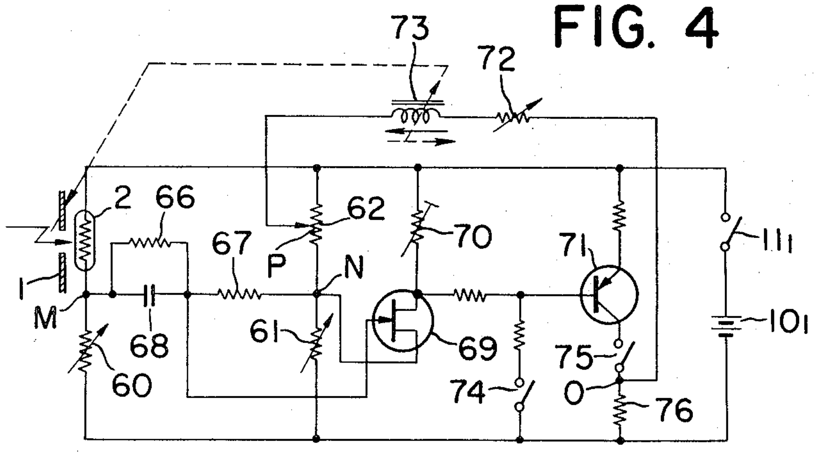
FIG. 4 is a diagram of the electric circuit in another embodiment of the exposure control device according to the present invention, and particularly showing a phase compensation circuit.

In the embodiment of FIG. 2, the phase compensation circuit has been illustratively shown to be connected with the output terminal of the differential amplifier, whereas FIG. 4 shows an example of the phase compensation circuit which is connected with the output terminal of the bridge circuit. The rest of the circuit is shown more simply than in FIG. 2.

In FIG. 4, the aperture means 1 is associated with a servomotor (or a meter movement). The photoelectric converter element 2 cooperates with variable resistors 63, 64, 65 to constitute a resistance bridge circuit and various types of photographing information are set up for these elements. Resistors 66, 67 and capacitor 68 together constitute a phase advance compensationc circuit. Further provided is a field effect transistor 69 for an output detection circuit, and a resistor 70 is provided for adjusting the voltage of the transistor 69. An output transistor 71 of the PNP type is provided in the illustrated circuit, but an NPN transistor may replace it in a modified circuit. A variable resistor 72 is provided to adjust the drive and brake forces of the servomotor (or of the meter movement). The coil of the servomotor (or of the meter movement) is designated by numeral 73. Ther are also provided switches 74 and 75 for changing over the aperture means 1 from its automatic operation to its manual operation. The collector of the transistor 71 is indicated at 76. A power switch and an electric power supply battery are designated by $11_1$ and $10_1$, respectively.

The operation of the device shown in FIG. 4 will be described hereunder. Various types of photographing information such as film sensitivity, number of frames to be photographed, etc. are initially set up for the bridge circuit resistors 60 and 61, whereafter the power switch 77 is closed. It is to be understood that the switches 74 and 75 are then open and closed, respectively. The photoelectric converter element 2 receives light from an object through the aperture means 1 to provide a resistance value corresponding to the quantity of light thus received. At the same time, a potential difference occurs between the output terminals M and N of the bridge circuit. The resistors 66, 67 and capacitor 68 constituting the phase advance compensation circuit are inserted between the output terminals M and N so that their output impedances may not greatly vary even if the various types of information set up for the circuit are varied in a wide range. The output of the bridge circuit is applied between the gate and source of the field effect transistor 69 having a high input impedance. The drain voltage of the transistor 69 suitably sets the variable resistor 70 to thereby control the output transistor 71 so that the resistor 76 in the output or collector circuit thereof experiences a potential difference. The coil 73 of the servomotor (or of the meter movement) and the adjust resistor 72 are serially connected between the output terminal O of the output transistor and one terminal P of the bridge circuit or the variable terminal of the variable resistor 62.

Assuming that the potential at the output terminal M of the bridge is higher than the potential at the other output terminal N, the drain current in the transistor 69 will be increased to thereby increase the output current of the transistor 71. As a result, the potential at the output terminal O of that transistor will also rise, and if the potential exceeds the potential at point P a current will flow through the motor circuit in the direction of full-line arrow to vary the aperture means in the stop-down direction. Thus, the potential at point P will rise until it is equal to the potential at point O, whereupon the motor is stopped to provide a proper exposure value.

Conversely, when the potential at the output terminal M of the bridge is lower than that at the other output terminal N and the potential at the output terminal O of the transistor 71 is lower than that at point P, a current will flow through the servomotor circuit in the direction of dotted-line arrow to vary the aperture means in the direction for opening the stop opening. Thus, the potential at point O will rise until it is equal to the potential at point P, whereupon the motor is stopped to provide a proper exposure value.

By adjusting the resistor 72 serially connected with the servomotor 73, the current flowing to the motor circuit may be varied to set the drive and brake forces thereof to optimum conditions. Also, by varying the point P of the resistor 62 which forms one side of the bridge circuit, the position of the zero point of the motor (or of the meter) may be set up as desired.

To manually set the F-value with the present device, the switch 74 is closed or the switch 75 is opened. In this position, when the resistor 76 is varied, the potential at pint P is constant while the potential at point O is varied. Therefore, the current in the motor circuit is variable as desired, and thus the aperture means associated therewith is also variable as desired.

As will be noted from the foregoing, the exposure control device of the present invention not only enables a stable operation to be accomplished by a relatively simple circuit arrangement but also permits ready adjustment of various portions and can operate under optimum conditions. Such a device is suitable for incorporation into cinecameras and the like and this is highly useful in practice.

Figure 5:
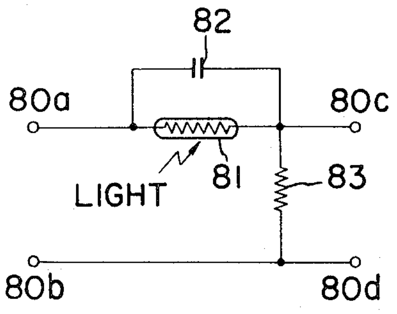
FIGS. 5 and 6 show further examples of the phase compensation circuit applicable to the device of the prsent invention.
Figure 6:
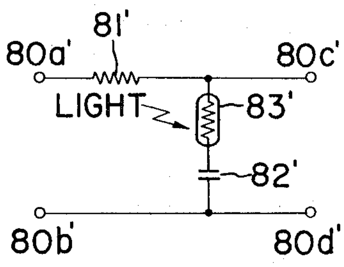

FIGS. 5 and 6 are diagrams showing examples of the phase compensation circuit. It has been noted above with respect to FIGS. 2 and 3 that the compensation circuit may advantageously be a phase shift circuit, but FIGS. 5 and 6 show an example of phase advance compensation circuit and an example of phase delay compensation circuit, respectively. The respective circuit examples include output terminals **80*a*, 80*b* and 80*a*′, 80*b*′, input terminals 80*c*, 80*d* and 80*c*′, 80*d*′, photoelectric converter elements 81 and 83′, capacitors 82 and 82′, and resistors 83 and 81′. The photoelectric converter element 81 or 83′ is adapted to provide the compensation circuit with a transfer characteristic corresponding to its response characteristic as photoelectric converter element 2 of FIG. 1, in accordance with the intensity of incident light. It will be apparent that a phase compensation circuit may also be constituted by using an ordinary resistor and capacitor instead of the above-described photoresponsive element. In case of a phase advance circuit (FIG. 5), the connection points of the output and input terminals of such circuit may be, for example, 80*a*–I′, 80*b*–J′, 80*c*–L and 80*d*–J′ in FIG. 2. In case of a phase delay circuit (FIG. 6), the output and input terminals may desirably be inserted in a negative feedback circuit and connected as at 80*a*′–I, 80*b*′–J, 80*c*′–H and 80*d*′–G. These circuits, accordingly, could be used instead of the previously described phase compensation circuit 37, 54, 53, 59, although in the second case the resistors 53 and 59** would be retained.

Figure 7:
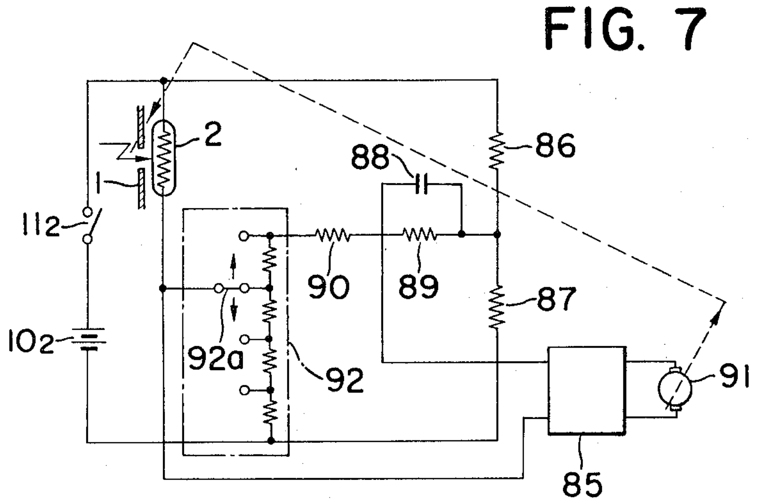
FIG. 7 is a diagram showing an electric circuit including a further example of the phase compensation circuit applicable to the device of the present invention.

FIG. 7 shows, in a diagram, a simplified embodiment of the exposure control device according to the present invention in which a phase advance compensation circuit is connected with the output terminal of a bridge circuit. The rest of the circuit arrangement is simply shown as a block 85. This circuit includes aperture means 1, a photoelectric converter element 2 disposed behind the aperture means, an electric power supply source $10_2$ and a power switch $11_2$. The circuit also includes resistors 86, 87 constituting a bridge circuit and a variable resistor 92 of the potentiometer type. The portion of the resistor 92 from its slide **92*a* to the negative terminal of the electric supply source $10_2$ forms a side of the bridge, and the other resistance elements of the variable resistor are serially connected with the resistor 90 of the phase advance compensation circuit. There are further provided control means 85 for detecting the output of the bridge circuit and for controlling the amplifier circuit, and a servomotor 91*a* whose drive is controlled by the control means 85**.

When the slide **92*a* of the resistor 92** of the potentiometer type is moved to set up photographing information for one side of the bridge, the resistance elements in the phase compensation circuit are also vaired to provide an approximately optimum compensation for a phase advance. The rest of the present circuit is identical in operation with the previously described embodiments and need not be described further.

Figure 8:
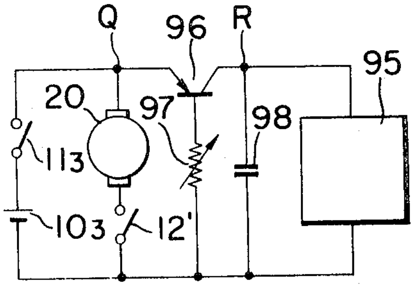
FIGS. 8 and 9 are diagrams showing electric circuits including constant voltage circuits applicable to the device of the present invention.
Figure 9:
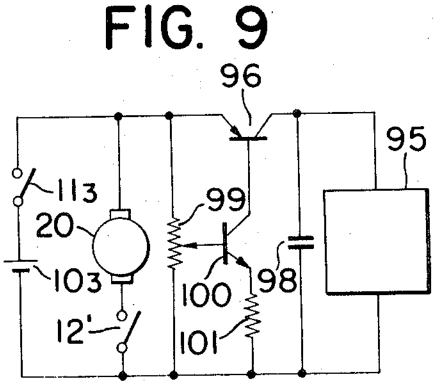
Figure 10:
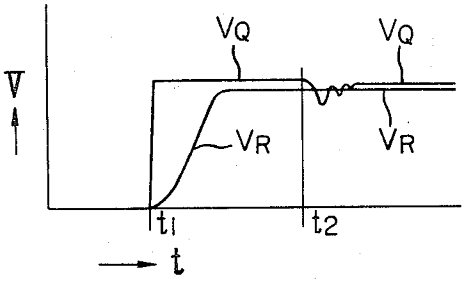
FIG. 10 is a graph illustrating the characteristic of the constant voltage circuit shown in FIG. 8 or 9.

FIGS. 8 to 10 illustrate embodiments of the source voltage stabilization circuit which are different from the embodiment of FIG. 2 and which are applicable to a camera having a common battery for operating both a film drive motor and an exposure control device. In this embodiment, the film drive motor is directly connected with the battery and the exposure control circuit is connected between the two terminals of a capacitor parallel-connected with the said electric power supply battery.

The battery $10_3$ may be a small dry battery. The power switch and film drive motor are designated by numerals $11_3$ and 20, respectively. A switch 12' is provided to move and stop a film and is operable by means of a release button. Numeral 95 designates an exposure circuit which, for example, may be an automatic stop-down circuit including the aforesaid photoelectric coverter element, or a servo circuit using a bridge.

In operation, the power switch $11_3$ is first closed by a first-stage depression of a release button to operate the automatic exposure circuit 95 to determine an F-value. By a second-stage depression of the release button, a film operating switch 12' is closed to start the film drive motor. The starting of the motor may cause a transient current to flow in the motor circuit, whose terminal voltage is temporally sharply reduced due to the internal resistance of the power supply battery and the like. This may temporarily vary the F-value determined by the automatic exposure circuit to provide an improper exposure. Such a phenomenon can be eliminated as by delaying the response of the automatic exposure circuit, but inconveniently this method may also delay the response to a variation in quantity of incident light. For this reason, the embodiment of FIG. 8 is provided with a source voltage stabilization means. It includes a PNP transistor 96, a base resistance 97 for the transistor 96, and a capacitor 98.

FIG. 10 is a graphical illustration of the operation of the voltage stabilization circuit used with the device of the present invention. The abscissa represents the time and the ordinate represents the voltages at points Q and R in FIG. 8. When the power switch $11_3$ is closed at time $t_1$, the voltage $V_Q$ at point Q immediately reaches the level of the terminal voltage of the battery, but the voltage $V_R$ at point R rises as shown by curve $V_R$ in FIG. 10 and reaches a predetermined level approximate to the terminal voltage of the battery because the capacitor 98 is being charged through the transistor 96 which is then closed in saturated condition. Since the emitter-collector resistance value of the transistor 96 assumes a very low value in the saturated condition thereof, the aforesaid predetermined voltage becomes substantially equal to the terminal voltage of the battery, so that the exposure control device 95 is operated to determine the F-value. When the film operating switch 12' is closed at time $t_2$, the film drive motor 20 is started. Thereupon, the motor starting current flows through the circuit and the voltage at point Q is caused to produce a ripple-like variation as shown by the curve $V_Q$ due to the internal resistance of the source battery. On the other hand, however, the voltage at point R is maintained substantially at a constant value by the charge stored in the capacitor 98. The charge in the capacitor 98 is inhibited from flowing into the motor circuit by the action of the transistor 96. Therefore, the exposure control circuit 95 is started substantially at a constant voltage even at the starting time of the motor and thus, the F-value is not varied. In this circuit, the transistor 96 is operated in saturated condition to pass a current to the exposure circuit by suitably setting the value of the base resistance 97, and this can extremely minimize the loss which may arise therefrom.

FIG. 9 is a circuit diagram showing another embodiment of the source voltage stabilization circuit used with the present invention in which an NPN transistor 100 is further added to prevent the charge in the capacitor 98 from flowing back to the motor circuit.

In this embodiment, numerals $10_3$, $11_3$, 12', 20, 95, 96 and 98 denote the same elements as those shown in FIG. 8. Further provided are a voltage divider resistor 99 and a control transistor 100 having an emitter resistance 101. In the shown circuit, the base potential of the control transistor 100 may be suitably set by the resistor 99 to thereby render the transistor 100 non-conductive when the source voltage extremely drops, thus rendering the serially connected transistor 96 non-conductive so as to prevent the charge in the capacitor 98 from flowing back to the motor. This accordingly prevents the back-flow of the stored charge in the capacitor 98 from occurring due to the leak of the transistor 96.

As will be appreciated from the foregoing description, the electric power supply source of the present invention ensures an automatic exposure control even when the film drive motor and the exposure circuit are operated by a single battery, and this is especially effective as a power source for smaller cinecameras and the like.

Figure 11:
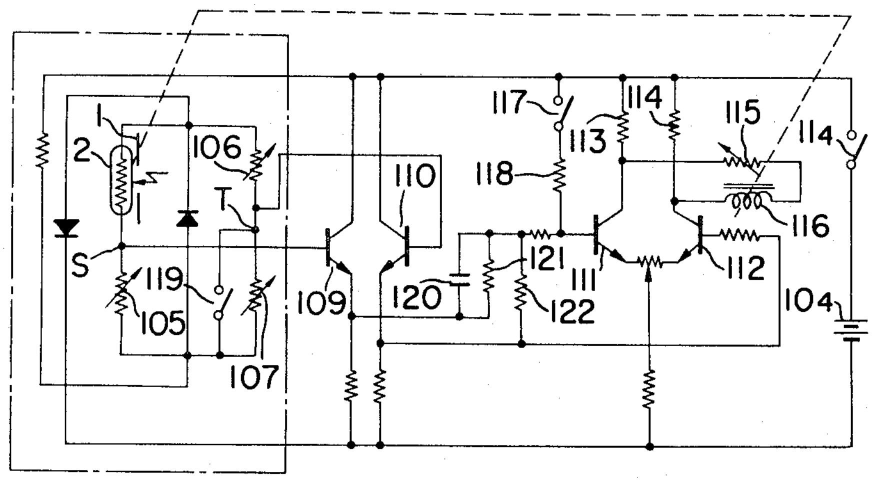
FIG. 11 is a diagram showing an electric circuit in a further embodiment of the device according to the present invention.

FIG. 11 illustrates a modified form of the means for changing over the exposure control device from automatic operation to manual operation. In this figure, the circuit arrangement is shown more simply than in FIG. 2 so as to facilitate the understanding of the change-over means.

The quantity of light incident on the photoelectric converter element 2 may be varied by varying the aperture means 1 through a servomotor. Resistors 105, 106 and 107, with the element 2, constitute a bridge circuit and are used to set up various types of photographing information. The aperture means 1 is associated with a servomotor and may also be manually operated. The circuit further includes transistors 109 and 110 forming a differential detection circuit, output stage transistors 111 and 112, load resistors 113 and 114, a resistor 115 for adjusting the servomotor (or meter movement), a switch 119 to be closed for manual operation, a switch 117 similar in operation to the switch 119, a resistor 118, and a capacitor and resistors 120, 121, 122 constituting a phase compensation circuit.

The operation of the present device is such that closing of either the switch 119 or the switch 117 makes the servo system unbalanced and the motor coil 116 drives the motor in the direction for opening the stop opening (or for a minimum value), thereby varying the aperture means in one direction. In this position, the aperture means is manually operated against its driven force to set itself to a desired F-value. Although not shown, a signal for unbalancing the bridge may be applied between the output terminals S and T of the bridge circuit with the same result obtained. The use of the shown change-over means prevents any fine movement of the motor irrespective of any variation occurring in the quantity of light incident on the photoelectric converter element and also prevents the power switch for the servo system from opening, thus enabling a desired F-value to be stably set up. Moreover, the addition of simple switches to the circuit leads to the simplification of the entire device.

Figure 12:
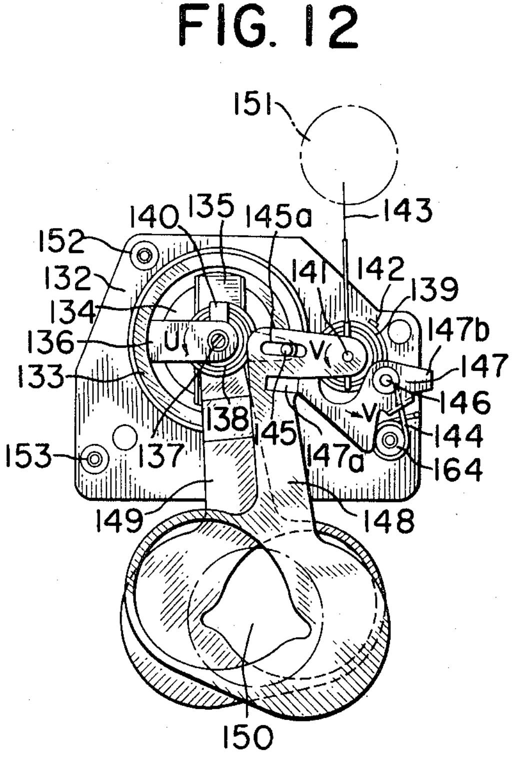
FIGS. 12 and 13 are a front view and a side view, respectively, of an aperture mechanism applicable to the device of the present invention.
Figure 13:
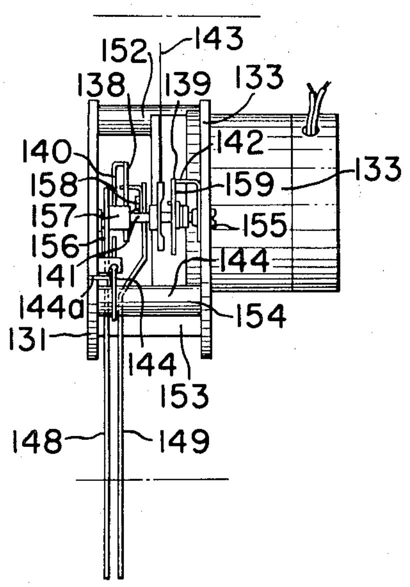

FIGS. 12 and 13 show an embodiment of the aperture means which is applicable to the exposure control device of the present invention. There are seen base plates 131 and 132, a meter yoke 133, a meter magnet 134, a frame 135 for the aforesaid coil 55, 73, 116, a metal member 136 for supporting the coil frame, a carrier member 137 for the coil frame, a coil spring 138 for imparting to one blade 149 a rotational force in the direction of arrow U, a coil spring 139 for imparting to the other blade 148 a rotational force in the direction of arrow V, and a member 140 for fixing one end of the coil spring 138 and whose position relative to the metal member 136 is adjustable. The blade 148 is rotatably mounted on a shaft 141. One end of the coil spring 139 is fixed by a member 142, and a needle 143 is secured to the shaft 141. A spring 144 is provided to impart to a later-described lever 147 a rotational force in the direction of arrow W. A pin 145 is studded in the blade secured to the coil frame 135 and is engageable in a groove 145*a* formed in the blade 148 to drive this blade. The lever 147, pivotally mounted on a shaft 146, may be rotated in the direction opposite to the direction of arrow W by manually operating one end 147*a* thereof, thus actuating the pin 145. The aperture blade 148 is a driven one and the aperture blade 149 is a driving one directly connected to the coil frame 135. There are further seen an opening 150 for stopping down a picture-taking lens, a viewfinder 151, posts 152, 153, 154 for fixing the base plates 131 and 132, carrier members 155 and 156 for the shaft 141, a collar 157 for securing the blade 148 to the shaft 141, a member 158 secured to the coil frame 135 and connected to the other end of the coil spring 138, and a member 159 secured to the shaft 141 and connected to the other end of the coil spring 139.

The operation of the present embodiment will now be described. Since the coil spring 138 has one end thereof connected to the member 140 fixed to the metal member 136 and the other end connected to the member 158 fixed to the meter shaft (i.e. coil frame 135) and the blade 149 is directly connected to the meter movement, the coil spring 138 imparts to the blade 149 and pin 145 a torque in the direction U when the meter drive force is zero. Similarly, the coil spring 139 inparts to the blade 148 and needle 143 a torque in the direction V. As a result, a pressure force as the internal force of the aperture means acts between the pin 145 and the groove 145a of the blade 148. Therefore, by suitably selecting the spring forces of the two springs, the aperture means may be designed so that the aperture means may be stopped and balanced at a desired open position when the electric power supply source is open. Therefore, by setting such a balanced rest position to the vicinity of the F-value for the ordinary, most frequent picture-taking operations (e.g. F8 to F11) the amount of deviation as required of the aperture blade when the meter movement is driven may be minimized, thus reducing the improper exposure time and providing an excellent response characteristic which suffers much less from overshooting, hunting and like phenomena.

In addition, the pressure force acting between the pin-slot engaging portion is useful to eliminate the vibration of the blades irrespective of any play present between the pin and the groove.

Depending on such factors as the shape of the stop opening, the shape of the groove cam and the characteristic of the detection circuit, the response characteristic may be different for a brightness of the object changing from shade to light and for a brightness changing from light to shade. For example, if the response is slower for the change of the brightness from light to shade, the overall response characteristic may be improved with a better result by suitably selecting the spring forces of the two springs to set them so that the aperture is open when the electric power supply source is open.

Figure 14:
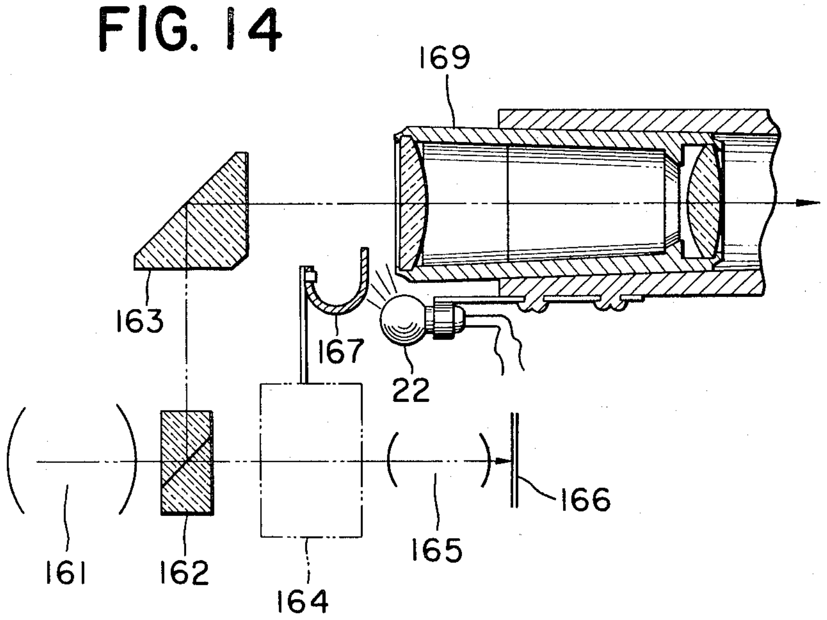
FIG. 14 is a cross-sectional view showing the means for indicating the exposure value within a viewfinder by means of an ammeter needle in the exposure control circuit applicable to the device of the present invention.
Figure 15:
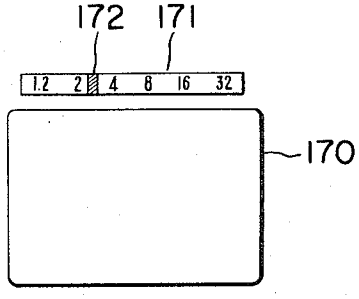
FIG. 15 is a front view showing an example of the viewfinder field provided by the means shown in FIG. 14.

FIG. 14 shows means for indicating an exposure value within the viewfinder by means of an ammeter needle for the exposure control circuit included in the exposure control device. The indicator means may comprise a lamp for illuminating the ammeter needle, and a switching control circuit (FIG. 2) for such lamp. The flickering of the lamp indicates whether the source voltage for the exposure control circuit is suitable or not. Also, as shown in FIG. 15, the suitability of the source voltage may always be monitored within the field of the viewfinder illuminated by the lamp. Such source voltage monitor means is suitable for use with cine-cameras or the like using a common battery as the electric power supply for the exposure meter circuit and the film drive motor.

This embodiment will be described more specifically hereunder. Referring to FIG. 14, it schematically shows the arrangement of the essential portion of a cinecamera provided with the source voltage monitor means of the present invention. There are seen a picture-taking lens 161, a spectroprism 162 having a half-mirror, a reflecting prism 163, an exposure control circuit 164 similar to that described above and including a light receiving element such as C*d*S and an ammeter, a relay lens 165, a film surface 166, an ammeter needle 167, a lamp 22 described above with respect to FIG. 2 and adapted to illuminate the needle 167, and a view-finder casing 169. FIG. 15 schematically shows an example of the viewfinder, which comprises a viewfinder mask 170, an aperture scale 171 and an ammeter needle 172 (corresponding to the needle 167 in FIG. 4).

The arrangement described just above is similar to that of the well-known cinecameras. The light passed through the picture-taking lens 161 is divided into two beams by the half-mirror of the spectroprism 162. One of the light beams i8 directed via the reflecting prism 163 into the viewfinder casing to provide a viewfinder field in the eyepiece as shown in FIG. 15. The other light beam passed through the spectroprism 162 is directed to the light receiving element in the exposure circuit so that a current corresponding to the quantity of light thus received flows to the ammeter to deviate the needle thereof. The angle of deviation of the needle appears on the scale 171 within the viewfinder to thereby indicate an F-value for proper exposure. In case of EE cameras, the deviation of the ammeter needle directly or indirectly drives the lens aperture means. The light passed through the spectroprism is focused on the film surface 166 through the relay lens 165 to expose the film to such light. The portion described just above is similar to the mechanism of the ordinary cinecamera, but the shown embodiment is provided with a lamp 22 for illuminating the ammeter needle 167. The needle 167 may, for example, be coated with some fluorescent material so that it may be clearly seen through the viewfinder's eyepiece with the aid of the illumination from the lamp 22. The lamp 22 may preferably be a miniature lamp, a luminous diode or the like which only requires a small electric power to emit light. When the lamp 22 is turned on, the ammeter needle in the viewfinder is illuminated thereby to shine red, for example, and thus clearly shows the F-value. When the source voltage drops to a value unsuitable for the operation of the exposure meter circuit, the indicator lamp 22 will be turned off as already described with respect to FIG. 2. Thus, the ammeter needle is no longer illuminated with its color unseen in the dark, thus giving a warning of the consumption of the battery.

We claim:

1. An exposure control device for cameras comprising:

a power supplying battery;

a film transporting motor connected in parallel with said battery;

light quantity controlling means for controlling the quantity of incident light passing therethrough, the light quantity controlling means including movable diaphragm means;

photoelectric converter means for receiving a light beam which has passed through said diaphragm means to convert it into an electrical signal;

detector means operatively connected in parallel with said battery said detector means including said photoelectric converter means, for detecting an electrical signal from said photoelectric converter means to comapre it with a signal representing preset photographing conditions to thereby produce a signal for adjusting the quantity of light passing through said diaphragm means;

control means for receiving an output signal from said detector means to adjust the quantity of light passing through said diaphragm means so that the level of said output signal assumes a predetermined value;

phase compensator means connected with both of said detector means and said control means to improve the transient response of said output signal from said detector means, said phase compensator means utilizing only one capacitance; and decoupling means connected between said detector means and said motor for connecting said detector means to said battery, said decoupling means including a switching transistor and a capacitor connected between the output terminal of said transistor and the battery, thereby permitting temporary interruption of the connection between said detector means and said battery by said switching transistor, when said battery suffers a sudden reduction of the supplying power level.

2. An exposure control device according to claim 1, wherein said detector means includes a bridge circuit comprising said photoelectric converter means in one of its branches.

3. An exposure control device according to claim 2, wherein said detector means further includes means for amplifying the output from said bridge circuit.

4. An exposure control device according to claim 3, wherein said amplifier means is a differential amplifier.

5. An exposure control device according to claim 1, wherein said conpensator means is characterized in that said phase compensator means included therein is serially connected with said detector means and has an adjustable transient response characteristic.

6. An exposure control device according to claim 5, wherein said phase compensator means includes a phase advance circuit (FIG. 5) connected for increasing response to rapid signal changes.

7. An exposure control device according to claim 5, wherein said phase compensator means includes a phase delay circuit (FIG. 6) in a feedback path for increasing response to rapid signal changes.

8. An exposure control device according to claim 3, wherein said phase compensator means is connected both with said amplifier means and said control means so as to receive the output signal from said amplifier means and provide compensation of said signal as applied to said control means.

9. An exposure control device according to claim 1, wherein said control means includes means for driving said movable diaphragm means.

10. An exposure control device according to claim 9, wherein said drive means includes a galvanometer movement.

11. An exposure control device according to claim 9, wherein said drive means includes a servomotor.

12. An exposure control device according to claim 9, wherein said control means further includes source voltage monitor means having a control circuit for indicating that the source voltage is being above a predetermined value and for giving a warning when the source voltage is below said predetermined value.

13. An exposure control device according to claim 12 in a camera having a viewfinder, wherein said source voltage monitor means further includes means for indicating the suitability of the source voltage within said viewfinder.

14. An exposure control device according to claim 9, wherein said control means further includes voltage clamp means having an electric circuit containing diodes connected for diverting any over-output from said detector means and thereby preventing excessive current from flowing in said driving means.

15. An exposure control device according to claim 14, wherein said control means includes amplifier means and wherein said clamp means is characterized in that said electric circuit for clamping includes diodes asymetrically connected across the output of said amplifier means so as to impose asymmetrical output voltage limits on said amplifier means.

16. An exposure control device according to claim 9, wherein said drive means includes means for biasing said light quantity controlling means to urge it towards a frequently used position for setting the quantity of light to be passed when said control means is quiescent.

17. An exposure control device according to claim 16, wherein said biasing means includes resilient mechanically means.

18. An exposure control device for cameras comprising:

an electrical power supply;

light quantity controlling means for controlling the quantity incident of light passing therethrough said light quantity controlling means including diaphragm means movable between first and second positions;
photoelectric converter means for receiving a light beam which has passed through said diaphragm means to convert it into an electrical signal;
detector means operatively connected in parallel with said power supply, said detector means including said photoelectric converter means, for detecting the electrical signal therefrom to compare it with a signal representing present photographing conditions to thereby produce a signal for adjusting the quantity of light passing through said diaphragm means;
control means for receiving an output signal from said detector means, said control means including electromagnetic means for actuating said diaphragm means in response to said output signal thereby to adjust the quantity of light passing through said diaphragm means so that the level of output signal assumes a predetermined value;
phase compensator means connected with both of said detector means and said control means to improve the transient response of said output signal from said detector means;
biasing means connected with said diaphragm means for biasing said diaphragm means towards maintaining said diaphragm means at its first position;
clamp means to prevent the electric power applied to said electromagnetic means from being more than a changeable upper limit, said clamp means comprising a plurality of diodes connected in an antiparallel and asymmetrical manner and connected to shunt excess power around said electromagnetic means in such a way as to cause said upper limit to be relatively low when said diaphragm means is moved towards said first position, and causing said upper limit to be relatively high when said diaphragm means is moved towards said second position

19. An exposure control device for cameras comprising:
an electric power supply;
diaphragm means having at least a movable blade member to control the quantity of incident light passing therethrough;
photoelectric converter means positioned in a path of said light which has come through said diaphragm means to receive at least a part of the light beam to convert it into an electrical signal corresponding to an amount of light which has passed said diaphragm means;
a bridge circuit operatively connected in parallel with said power supply and including said photo-electric converter means at one of its branches and variable resistors at the branches for detecting the electrical signal from said converter means to compare it with a signal representing preset photographing conditions set at the resistors of the circuit to thereby produce an unbalanced signal for adjusting said diaphragm means;
differential amplifier means connected to said bridge circuit for receiving said signal from the bridge circuit;
electromagnetic means connected to output terminals of said amplifier means responsive to direction and magnitude of a current supplied from said amplifier means thereto for electromagnetically actuating said diaphragm means towards a position at which the current supplied thereto becomes substantially zero;
compensator means connected both with said bridge circuit and said amplifier means, said compensator means including potentiometer means having its variable tap connection connected to said converter means, one fixed terminal connected to a terminal of said power supply and the other fixed terminal connected to a resistor branch of a phase shift compensating circuit, so that reduction of resistance in series with said converter means is accompanied by increase of resistance in said resistor branch of said phase shift compensating circuit.

20. An exposure control device for cameras comprising:
a battery;
a film transporting motor connected in parallel with said battery;
diaphragm means adjustable of its aperture to control the quantity of incident light which has passed therethrough;
photoelectric converter means positioned to receive at least light which has passed through said diaphragm means for converting it into an electrical signal corresponding to an amount of light passing said diaphragm means;
detector means operatively connected in parallel with said battery, said detector means including said photoelectric converter means for detecting an electrical signal from said photoelectric converter means to compare it with a signal representing preset photographing conditions to thereby produce a signal for adjusting the quantity of light passing through said diaphragm means;
control means for receiving an output signal from said detector means to adjust the quantity of light passing through said diaphragm means so that the level of said output signal assumes a predetermined value;
phase compensator means connected with both of said detector means and said control means to increase the transient response of said output signal from said detector means;
decoupling means connected between said detector means and said motor for connecting said detector means to said battery, said decoupling means including a switching transistor and a capacitor connected between the output terminal of said transistor and the battery, thereby permitting temporary interruption of the connection between said detector means and siad battery by said switching transistor, when said battery makes a sudden change in the supplying power level,
release means provided on said camera for actuating said film transporting motor and said detector means; and
switch means operable by said release means, said switch means including a release switch for actuating said motor and an exposure setting switch for actuating said detector means, said exposure setting switch being closed by a first partial stroke of depression of said release means and said release switch being closed by a second partial stroke of said depression of the release means.

* * * * *